May 16, 1950 J. D. REID 2,507,995

TELEVISION RECEIVING SYSTEM

Filed Nov. 12, 1947 5 Sheets-Sheet 1

Inventor

John D. Reid.

By Alden D. Redfield.

Attorney

May 16, 1950 J. D. REID 2,507,995

TELEVISION RECEIVING SYSTEM

Filed Nov. 12, 1947 5 Sheets-Sheet 2

Inventor

John D. Reid

By Alden H. Redfield

Attorney

May 16, 1950 J. D. REID 2,507,995

TELEVISION RECEIVING SYSTEM

Filed Nov. 12, 1947 5 Sheets-Sheet 3

Inventor

John D. Reid.

By Alden D. Redfield.

Attorney

May 16, 1950 J. D. REID 2,507,995

TELEVISION RECEIVING SYSTEM

Filed Nov. 12, 1947 5 Sheets-Sheet 4

Inventor

John D. Reid.

By Alden D. Redfield.

Attorney

May 16, 1950 J. D. REID 2,507,995

TELEVISION RECEIVING SYSTEM

Filed Nov. 12, 1947 5 Sheets-Sheet 5

Inventor

John D. Reid.

By Alden D. Redfield.

Attorney

Patented May 16, 1950

2,507,995

UNITED STATES PATENT OFFICE 2,507,995

TELEVISION RECEIVING SYSTEM

John Drysdale Reid, Cincinnati, Ohio, assignor to Avco Manufacturing Corporation, Cincinnati, Ohio, a corporation of Delaware Application November 12, 1947, Serial No. 785,303

1 Claim. (Cl. 250—20)

Figure 1:
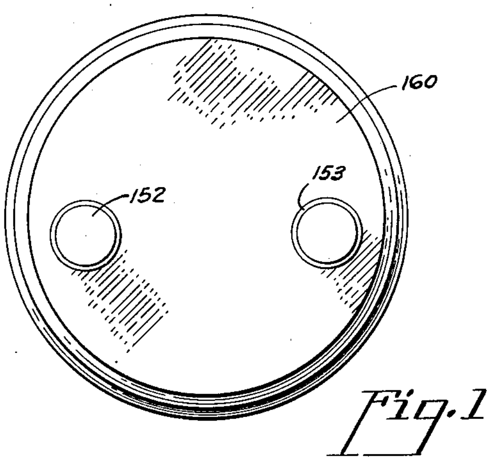

The present invention relates generally to electromagnetic wave signal receivers, particularly to VHF and UHF receivers and specifically to television receivers of the superheterodyne type. Briefly described in one aspect, the invention comprises a novel television receiver featuring channel selector units. Each unit is demountable and comprises tuned R. F. antenna-input and local oscillator circuits optimized to render the receiver responsive to signals within a specific one only of a plurality of television channels. Each receiver requires only a limited number of units to cover transmitters in service in its area.

Television receivers of the superheterodyne type generally comprise an antenna system for intercepting electromagnetic wave energy, a radio frequency signal translating or amplifying system for applying the signal energy from a desired transmitting station to a frequency converter circuit consisting of a local oscillation generating system and a mixer or first detector for beating the local oscillations and the received signals together to convert the latter into intermediate-frequency signals, a picture intermediate-frequency amplifier system for amplifying the I. F. signals carrying the picture information, terminated in a second detector or demodulator for abstracting or deriving from the amplified I. F. signals the modulation components of the received picture signals (consisting of line or horizontal pulses which cause successive lines to be scanned, field or vertical pulses which cause repetition of the line scanning sequence and video signals which cause development of the reproduced picture), circuits for separating the horizontal and vertical pulses from the video signals and from each other, a video frequency amplifying system for amplifying the video signals, a picture tube responsive to the video signals for developing the picture elements, and a pair of saw-tooth wave generators responsive to the horizontal and vertical pulses for controlling the position and sequence of the picture elements, a sound intermediate-frequency amplifier system, a sound detector or discriminator for abstracting or deriving from the amplified I. F. signals the modulation components of the sound I. F. signals, an audio voltage amplifier followed by an audio power amplifier, which in turn feeds a loud speaker. The present invention relates to that portion of a television receiver which is electrically positioned between the antenna system and the frequency converter. This portion comprises elements hereinafter collectively referred to as the "R. F. input system."

The basic functions which should be performed by the R. F. input system are:

First, in response to the will of the operator, to select modulated carrier wave signals in a desired channel and to discriminate against signals in all other channels;

Second, to convert those signals into intermediate-frequency signals and with predetermined I. F. carrier frequencies for the picture and sound I. F. frequencies;

Third, to pass the signal energy to the intermediate-frequency amplifier with a maximum of gain and a minimum of distortion.

All of these functions should be performed in a commercially practical manner, without imposing undue costs and operating complexities on the operator.

The design of an R. F. input for television receivers poses a very formidable problem. In the first place, each of the presently assigned television frequency channels is six megacycles wide. Second, the total span from the lowest presently assigned channel (44–50 megacycles) to the highest (210–216 megacycles) is one hundred and seventy-two (172) megacycles. Among those skilled in the art it is axiomatic that, the wider the band, the more difficult to achieve selectivity, gain, fidelity, sensitivity and antenna line impedance match in the reception of desired signals and discrimination against undesired signals. It is impossible to provide an R. F. input system continuously tunable throughout this span and at the same time to provide optimum conditions for the reception of signals in each channel. In continuously tunable R. F. input systems, performance in each channel is impaired in order that signals in all channels may be received. Furthermore, the correct performance of the sound and video I. F. circuits and detectors requires that the I. F. carrier frequencies should be maintained with considerable accuracy, a requirement it becomes increasingly difficult to comply with as the R. F. frequencies are increased. One basic object of the invention is to avoid this serious limitation of prior art systems and provide an R. F. input system in which signals from any one of a plurality of available channels may be selected under optimum conditions for each channel.

Various proposals for avoiding these limitations have been made with results varying from mediocre performance to failure, each of such proposals being characterized by one or more of the following non-exhaustive list of disadvantages:

First, the peril of complete obsolescence if existing assigned frequency channels are changed;

Second, lack of provisions for additional channels if such channels should be assigned;

Third, redundant provisions for channels other than those available in the area where each receiver is to be used;

Fourth, lack of flexibility of antenna arrangements;

Fifth, untuned R. F. stages and resultant lack of sensitivity gain, freedom from interference, and loss in signal-to-noise ratio;

Sixth, poor antenna line match;

Seventh, exposed components, susceptible to humidity changes and other factors causing poor oscillator frequency stability;

Eigth, switching in oscillator frequency-determining circuits, with resultant aggravation of frequency instability;

Ninth, the need for relatively long leads in the frequency-determining circuits, resulting in low fixed capacitances and therefore poor frequency stability;

Tenth, the necessity of frequent retuning;

Eleventh, the necessity of fine adjustments and receiver alignment by service personnel in the field;

Twelfth, undue complexity resulting in excessive costs and service difficulties.

It is believed that the present invention provides a solution to this problem and avoids the disadvantage and limitations attendant upon the prior art systems.

The basic objects of the invention are to provide:

First, a novel channel selector unit;

Second, a novel dual channel selector unit;

Third, a system of standardized channel selector units;

Fourth, a television receiver having a flexible arrangement of one or more channel selector units, such units being provided in each case to correspond to the television stations in service in the vicinity of the receiver;

Fifth, a television receiver having a plurality of such channel selector units and a switching system for readily and easily selecting the signals from any one of the television transmitting stations in service in its area;

Sixth, a television receiver having one or more selector units each specially designed, tailored and optimized for its respective television channel, whereby maximum gain, selectivity, fidelity, efficiency and sensitivity may be achieved;

Seventh, a television receiver having readily replaceable channel selector units, whereby when the receiver is moved from an area served by one group to another area served by another group of transmitter stations, a different set of channel selector units may be substituted for those previously installed in the receiver;

Eighth, a television receiver having facilities for the addition of channel selector units for additional channels that may become available in the future;

Ninth, a television receiver having replaceable channel selector units, the cost of which is minor compared to the total cost of the receiver, so that a change in frequency allocations would involve low-cost replacement of selector units but not high-cost replacement of the receiver as a whole;

Tenth, a television receiver having facilities for ready conversion to receive color television signals in the ultra-high-frequency television band, should color television broadcasting service with standards compatible with present black and white television standards, or standard signals become available in this band;

Eleventh, a television receiver having channel selector units so constructed and arranged and of such high frequency stability that manual vernier tuning is eliminated, whereby to avoid the disadvantages and limitations attendant upon retuning during a program;

Twelfth, a television receiver having such construction and operation that no radio-frequency service alignment equipment or operations are required;

Thirteenth, a novel selector unit having such arrangement that when a local oscillator circuit for a particular channel is selected as by switching, the proper selective antenna input circuit is simultaneously selected;

Fourteenth, a television receiver which does not require the dependent alignments of several channels;

Fifteenth, a receiver which avoids the complications of manufacturing, testing, servicing, tuning, aligning and adjusting prior art multi-channel tuning systems.

Ancillary objectives of the invention are to provide: a channel selector unit having a hermetically sealed construction and requiring no oscillator circuit switching, whereby great frequency stability is achieved; a television receiver having channel selector units each readily replaceable and demountable, whereby service and repair are facilitated and simplified; a novel channel selector unit which is unusually well shielded and balanced; a channel selector unit having such construction that local oscillator radiation is minimized; a channel selector unit which is simple to manufacture, the channel selector units and main chassis being separately made; a channel selector unit which permits local interference conditions to be overcome by built-in filters or traps and without extra switches; a novel channel selector unit adapted for flexible antenna provisions.

Still another subordinate object of the invention is to achieve maximum utilization of circuit components.

For a better understanding of the present invention, together with other and further advantages, capabilities and objects thereof, reference is made to the following description of the accompanying drawings, in which there are shown pertinent portions of an illustrative television receiver having channel selector units in accordance with the invention.

Figure 2:
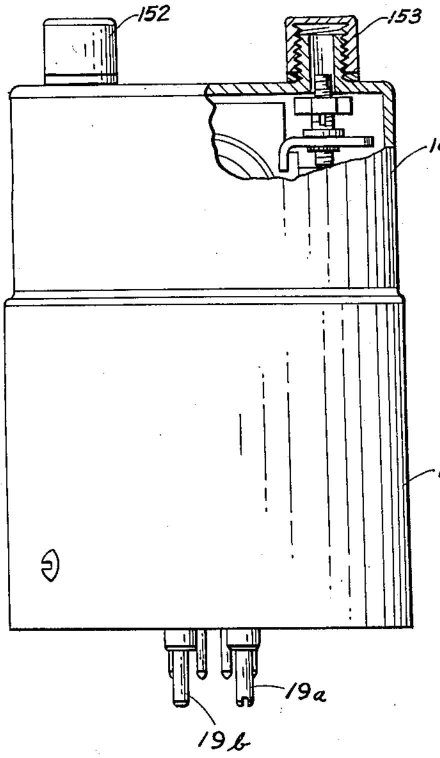
Figure 9:
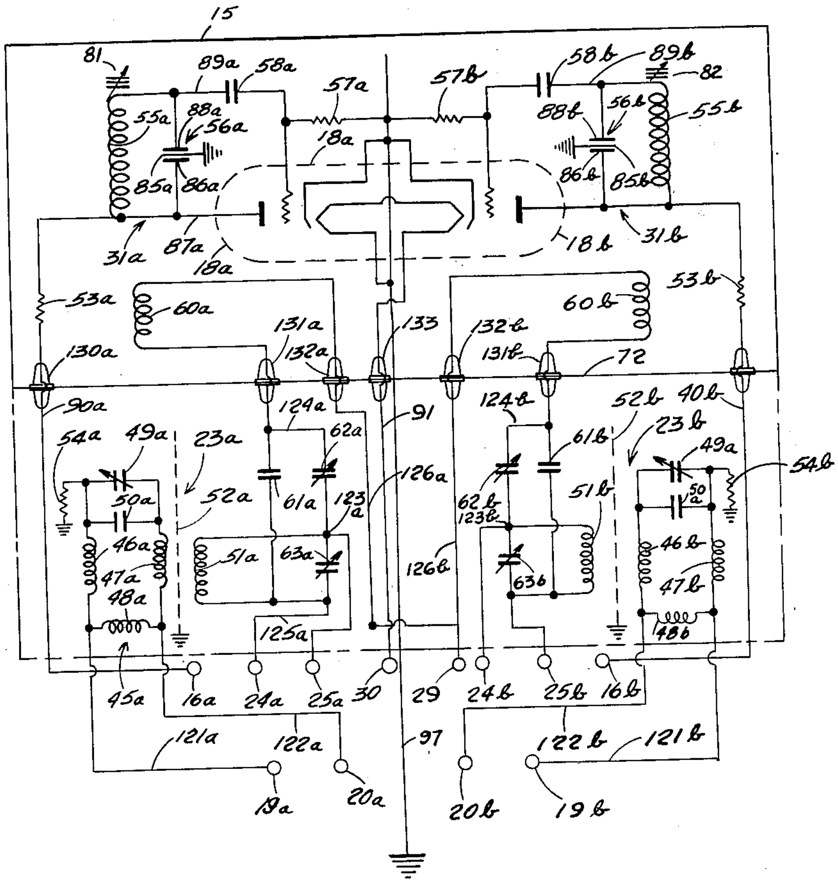
Figure 10:
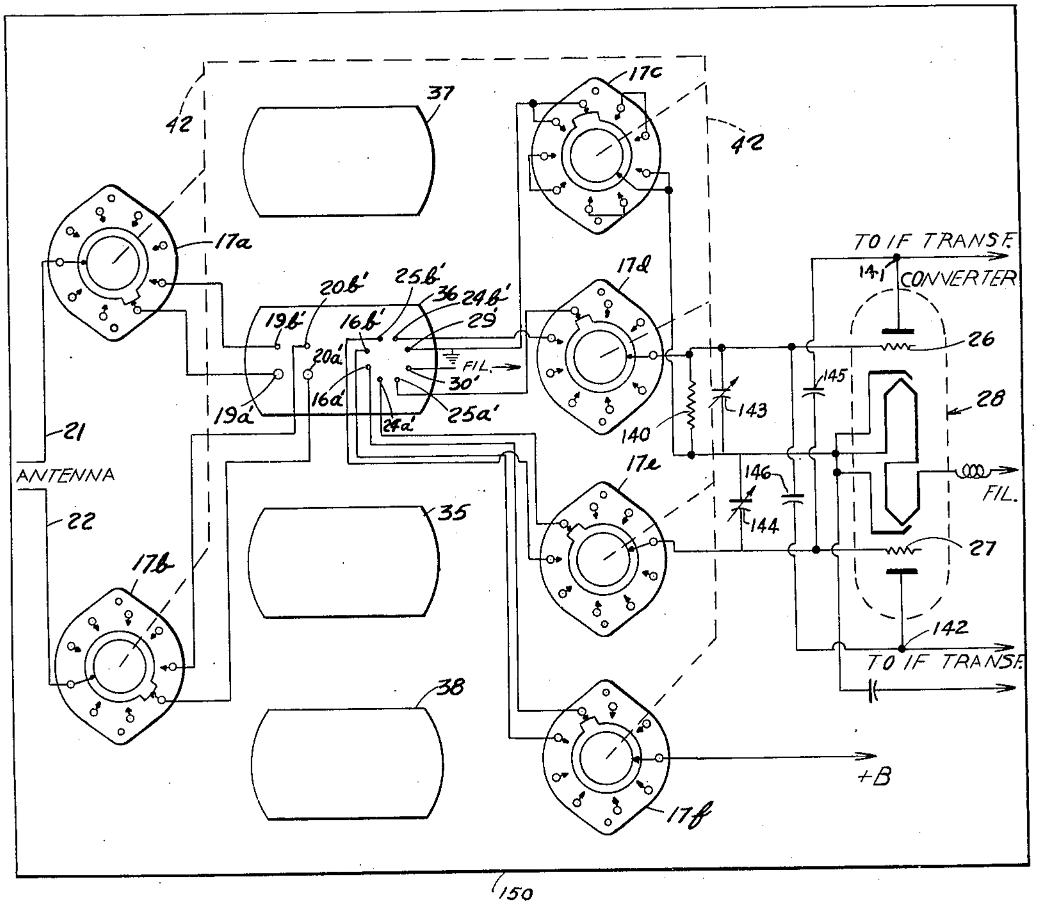
Figures 11, 12:
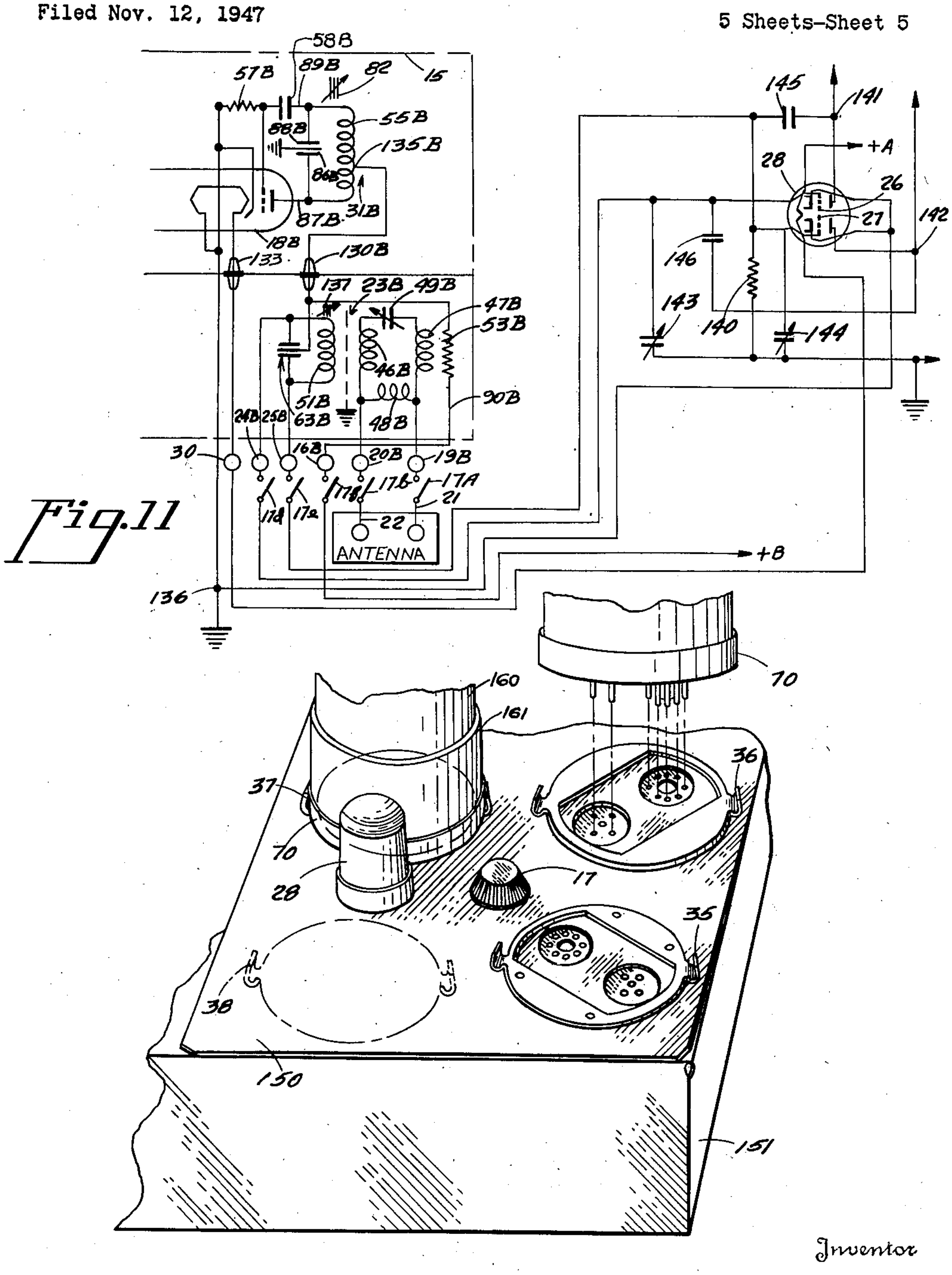

In the drawings:

Figs. 1 and 2 are, respectively, top and front (partly in section) views, including the covers of the novel channel selector unit having separate circuits for two channels; Figs. 3, 4, 5, 6, 7 and 8 are, respectively, top, front, left side, rear, right side and bottom views of the channel selector unit, the covers being removed; Fig. 9 is a circuit diagram symbolically showing the two sets of electrical circuit elements included in the two-channel selector unit illustrated in Figs. 1–8; Fig. 10 shows certain portions of a television receiver in accordance with the invention, beginning with the antenna and ending with the frequency converter stage, including four sockets on which four plug-in channel selector units as shown in Figs. 1–9 may be mounted and ganged switch sections constituting a channel selector switch whereby any one of eight television channels may be selected at the will of the operator; Fig. 11 is an alternative circuit diagram of a set of electrical circuit elements suitable for inclusion in the Fig. 1 embodiment; and Fig. 12 is a perspective view showing a channel selector unit being plugged into a socket on the receiver chassis.

A complete appreciation of the present invention involves a consideration of the television frequency channels presently assigned by the Federal Communications Commission as well as present and anticipated marketing conditions in the television field.

There are now thirteen television channels individually numbered 1 to 13, inclusive. Adjacent non-spaced channels are not assigned in any one metropolitan district. No change in this assignment policy is reasonably to be anticipated. Channel 1 not being assigned to any of the principal metropolitan centers, it follows that not more than seven channels can or will be assigned in any one community. In many communities only one or two channels are or will be available. It is fairly estimated that by the year 1954 the average number of channels available in all television-serviced areas throughout the United States will be four, that at least 38% of the television receiver markets will be served by not more than one or two channels, and that not more than 34% of such markets can potentially be served by seven channels. It will be seen that it is highly desirable to provide a flexible receiver construction, adapted to be optimized for substantially only those channels available in its location, whether the number be one, four or seven, rather than a universal receiver construction having redundant circuit arrangements permitting it potentially to receive signals from six to twelve non-available channels, which circuit arrangements preclude optimum design for the available channels.

It is highly desirable to "tailor" each receiver in accordance with the television channels available in the area wherein it is installed. This requirement conflicts with the practical requirements of mass manufacturing of television receivers, which dictate uniformity in chassis units produced. The invention reconciles these conflicting requirements by providing channel selector sub-assemblies demountable from the chassis. It has been found that one or more units chosen from three single channel selectors for channels 1, 12, 13 and five dual-channel selectors for channels 2–4, 3–6, 5–7, 8–10 and 9–11 will cover all channels in all localities wherein television service is presently available or projected. In New York, New York, for example, three dual-channel selectors for channels 2–4, 5–7, 9–11 and one single channel selector for channel 13 will afford complete channel coverage. In Hartford, Connecticut, one dual-channel selector for channels 8–10 will provide complete coverage. The significance of these facts is that a New York customer can purchase four channel selectors and can obtain optimum reception over all present and contemplated channels in his area, saving the cost of redundant circuit arrangements which potentially provide for reception of non-available channels. A Hartford customer will require only one dual-channel selector unit, for example. A Scranton, Pennsylvania, customer would need one single-channel selector unit for channel 1 and a selector unit for channel 11, for example. He would preferably be provided with a dual-channel unit for channels 9–11. Although the provision for channel 9 would be redundant, the savings effected, through manufacturing standardization in providing only the five above-mentioned dual channel units, would benefit him and all other consumers. Of course, it is within the scope of the invention to provide single channel units for each of the channels.

At the present time, only three selector units for channels 2–4, 3–6 and 5–7 need to be manufactured, for complete coverage of television stations actually in operation.

The channel selector units may be manufactured, installed, removed or serviced as sub-assemblies. When a receiver is moved to a different area, one or more channel selectors may be substituted for those previously installed. If different frequency assignments are made, different channel selector units for the different channels may be provided.

If repair or replacement of a channel selector unit becomes necessary, the receiver need not be delivered to a repair agency. No tuning is required since the operator simply switches in the desired selector and receives the program from any desired station in his area under optimum conditions. The selector units are hermetically sealed to assure frequency stability and well shielded to minimize oscillator radiation. Flexible antenna arrangements may be made. Each receiver is specially tailored for its television service area. By starting with one channel selector unit and adding others as additional channels become available in his area, the consumer may build up his receiver as required. The invention, in short, achieves the advantages of truly tailored television along with those of standardized manufacturing.

Referring now specifically to Figs. 1–8, there is shown an illustrative form of dual channel selector unit in accordance with the invention. Figs. 9 and 11 show alternative circuit diagrams suitable for incorporation in the Fig. 1–8 embodiment. Fig. 10 is a circuit diagram showing the relationship between the four channel selector unit mounting sockets, their ganged-section channel selector switch, and the antenna system and frequency converter of a television receiver. The construction and operation of those stages in cascade with and following the converter unit are not embraced within the present invention and are so well known to those skilled in the art that they need not be shown or described herein.

Referring first to Fig. 9, the dual-channel selector unit comprises: a mounting generally indicated by the numeral 15; two supply terminals 16*a*, 16*b* adapted to be selectively coupled to a suitable space current source +B (Fig. 10) by section 17*f* of a ganged channel selector switch 17 to supply plate potential to a desired one of oscillator tube sections 18*a*, 18*b* (Fig. 9); two pairs of input terminals 19*a*, 20*a* and 19*b*, 20*b* adapted to be selectively coupled to antenna leads 21, 22 (Fig. 10) by sections 17*a* and 17*b* of channel selector switch 17 to apply received signals to a desired one of R. F. input antenna transformer circuits 23*a*, 23*b*; two pairs of output terminals 24*a*, 25*a* and 25*b*, 24*b*, adapted to be selectively coupled to the pair of control electrodes 27, 26 of frequency converter tube 28 (Fig. 10) by sections 17*e* and 17*d* of channel selector switch 17 to supply to the frequency converter received signals in a desired channel and local oscillations of appropriate frequency; a common terminal 29 adapted to be grounded through section 17*c* of the channel selector switch in order to ground the cathode of converter tube 28 at a point near to the channel selector circuit in operation; a filament supply terminal 30; and two local oscillator circuits 31a and 31b, one for each channel; and associated wiring and mechanical structures shown in Figs. 1–8.

The television receiving system illustrated in Fig. 10 embraces provisions for four dual-channel selector units. Accordingly, it includes four sockets symbolically shown at 35, 36, 37 and 38 into which the channel selector units are plugged. The connections and details of socket 36 are the same as those of sockets 35, 37 and 38, so that socket 36 is alone described in detail herein. It includes an octal arrangement of conductive connector elements 16b', 25b', 24b', 29', 30', 25a', 24a', 16a', respectively, complementary to and adapted to receive plug terminals 16b, 25b, 24b, 29, 30, 25a, 24a, 16a, and a quadrangular arrangement of connector elements 19a', 19b', 20b', 20a', respectively, complementary to and adapted to receive plug terminals 19a, 19b, 20b, 20a of the channel selector unit.

Switch section 17a has a rotary contact connected to antenna lead 21 and eight fixed contacts, two of which are connected to terminals 19a', 19b' of socket 36, as shown, and the remaining three pairs of which are connected to corresponding terminals (not shown) on sockets 37, 35 and 38.

Switch section 17b has a rotary contact, connected to antenna lead 22, and eight fixed contacts, two of which are connected to terminals 20a', 20b', of socket 36, as shown, and the remaining three pairs of which are connected to corresponding terminals (not shown) on sockets 37, 35 and 38.

Switch section 17f has a rotary contact, connected to the plate supply + B, and eight fixed contacts, two of which are connected to terminals 16a', 16b', as shown, and the remaining three pairs of which are connected to corresponding terminals (not shown) on sockets 37, 35 and 38.

Switch section 17e has a rotary contact, connected to the control electrode 27 of converter tube 28, and eight fixed contacts, two of which are connected to terminals 24a', 25b', as shown, and three pairs of which are connected to corresponding terminals (not shown) on sockets 37, 35 and 38.

Switch section 17d has a rotary contact connected to the control electrode 26 of tube 28, and eight fixed contacts, two of which are connected to terminals 25a' and 24b', as shown, and three pairs of which are connected to corresponding terminals (not shown) on sockets 37, 35 and 38.

Switch section 17c has a rotary contact, connected to the cathodes of converter tube 28, and nine fixed contacts. One interconnected pair of these contacts is connected to terminal 29', and the three other interconnected pairs are connected to corresponding terminals (not shown) on sockets 37, 35 and 38. The remaining contact is connected to the rotary contact. The rotary contact has a sufficient arcuate length to span two contacts. The remaining fixed contact is connected to the rotary contact. Since the arcuate length of the rotary contact is made sufficient to span two contacts, the addition of the ninth terminal will insure that a cathode to ground connection for the tube 28 always exists. This is desirable to avoid noise during switching.

The sections of the switch 17 are ganged to operate in unison by a suitable expedient indicated by the dashed lines 42 (Fig. 10). Switch 17 constitutes means for selectively coupling either of the two channel arrangements in any of the four channel selector sub-assemblies to the common circuit means comprising the converter tube 28 and all succeeding stages (not shown) in cascade with the converter stage. As shown in Fig. 10 one channel (see left side of Fig. 9) of the channel selector unit mounted in socket 36 has been selected. The other channel of this unit may be selected by turning switch 17 counterclockwise to the next position. Each of other six channels may be similarly selected.

Each channel selector unit is plugged into one of sockets 35, 36, 37, 38 as indicated in Fig. 12. Switch 17 is manipulated to render the receiver responsive to signals in the desired channel. During reception of such signals no vernier tuning is required because the invention facilitates design for great frequency stability in the oscillator for each channel.

The basic function of sockets and the switch 17 is to intercouple or electrically interpose any one of the eight channel-selective systems between the antenna and the first converter stage. This basic function involves four sub-functions:

First, coupling the anode voltage supply to the proper oscillator tube anode, as by the circuit including elements +B, 17f, 16a', or 16b', 16a or 16b, anode of 18a, or 18b;

Second, grounding the cathode of converter tube 28 near the proper channel, as by the circuit including elements 17c, ground, 29', 29.

Third, coupling the proper antenna input transformer secondary to the converter tube input circuit, as by the pair of circuits 24a, 24a', 17e, control grid 27 and 25a, 25a', 17d, control grid 26 or the pair of circuits 24b, 24b', 17d, control grid 26 and 25b, 25b', 17e, control grid 27;

Fourth, coupling the proper antenna input transformer to the wave intercepting system, as by the pair of circuits 21, 17a, 19a', 19a and 22, 17b, 20a', 20a or the pair of circuits 21, 17a, 19b', 19b, and 22, 17b, 20b', 20b.

Referring now specifically to Fig. 9, a suitable circuit for the dual-channel selector units is shown. A single channel selector unit comprises the mounting 15, a fixed-tuned local oscillator circuit generally indicated at 31a, a fixed-tuned antenna input circuit generally indicated at 23a, together with terminals 19a, 20a, 16a, 24a, 25a, 29, 30 and associated wiring. It has been found that the dual-channel type has unique manufacturing advantages and can be constructed at a cost little in excess of the cost of a single channel unit. There is also provided in the dual-channel type, another R. F. input comprising a fixed-tuned antenna input circuit 23b, a fixed-tuned local oscillator circuit 31b, together with terminals 19b, 20b, 16b, 25b and 24b. Terminals 29 and 30 are common to both channels. The cathodes of tube 18, one filament lead and mounting 15 are grounded. Filament terminal 30 is connected to a suitable A potential source (Fig. 10, not shown). Since the channels are generally similar and differ only in circuit dimensions, the following description of Fig. 9 is confined to the channel including antenna input transformer circuit 23a and local oscillator circuit 31a.

The antenna transformer circuit 23a comprises a double-tuned transformer with an ungrounded primary and a push-pull connected secondary. It includes a primary 45a, coupled to input terminals 19a, 20a and comprising two inductor portions 46a, 47a, tapped at their closed end by inductor 48a to match a 75 ohm antenna line. This primary is tuned by a parallel combination of trimmer capacitor 49a and fixed capacitor 50a shunted across the open end of inductors 46a, 47a. The resistor 54a is a static leak preventing a voltage build-up in the antenna in the case where a separate antenna is connected directly to the converter unit.

Transformer circuit 23a also includes a secondary 51a, electrostatically shielded from the primary by a shield 52a, provided for the purpose of reducing push-push radiation of local oscillator signals, resulting from electrostatic coupling from the secondary into the primary. Further to avoid oscillator signal currents conducted by shields or chassis, the oscillator coupling coil 60a of the channel being used and the converter cathodes may be grounded at a common point 29, 29' (Fig. 10).

Secondary 51a is coupled to output terminals 24a, 25a, thereby applying the received signals to those terminals with a stepped-up voltage.

A triode section 18a of an indirectly-heated-cathode twin triode 18 is employed as an oscillator tube. Anode potential is available at terminal 16a when this channel is chosen and is applied to the anode of triode 18a through plate resistor 53a, the tube being arranged to employ shunt-feed in its plate circuit. The oscillator is a Colpitts type comprising a parallel-resonant tank circuit, including an inductor 55a and a double-ended capacitor 56a, coupling the plate and grid circuits of tube 18a. The capacitor 56a is so arranged as to provide capacitance between the grid circuit and ground and capacitance between the plate circuit and ground, having one terminal grounded or effectively connected to the cathode of tube 18a. The instantaneous voltages at the ends of the parallel-resonant circuit are opposite in polarity with respect to the cathode and in the proper phase to sustain oscillation. A grid resistor 57a is connected between grid and ground of tube 18a. A blocking capacitor 58a is connected between the tank circuit and the grid, to isolate the grid from the D. C. plate potential. A Colpitts oscillator circuit is per se well known to those skilled in the art, and many descriptions of its construction and operation may be found in the literature, for example, in:

Applied Electronics, M. I. T. Staff, p. 617, 1943, John Wiley & Sons, Inc., New York, New York;

Theory and Applications of Electron Tubes, Reich, p. 391, 1944, McGraw-Hill, New York, New York;

Radio Engineering, Terman, p. 349, p. 359, 1937, McGraw-Hill;

Radio Amateur's Handbook, p. 80, 1947, American Radio Relay League, Inc., West Hartford, Conn.

As stated above, the amplified received signals are applied to the grids of converter tube 28 (Fig. 10) through terminals 24a, 25a (Fig. 9). The local oscillations are also injected into the grids of the converter, being applied to terminals 24a, 25a, and 29, in balanced relation with respect to grounded terminal 29, by coil 60a, electromagnetically coupled to inductor 55a, and a capacity divider comprising capacitor 61a and adjustable capacitor 62a. This capacity divider is shunted across antenna input transformer secondary 51a. One terminal of coupling coil 60a is connected to the junction of series-arranged capacitors 61a, 62a and the other terminal is connected to terminal 29.

A trimmer capacitor 63a is shunted across the antenna input transformer secondary 51a for tuning that secondary.

Chassis ground currents and oscillator radiation may be reduced by obtaining the local oscillator voltage from the tank circuit 55a, 56a by means of a coupling coil 60a, rather than employing a tap on the coil 55a.

The filaments of tube 18 are connected in series between the grounded mounting member 15 and terminal 30.

As stated above, the construction and operation of the other channel (Fig. 9) including oscillator tube section 18b, oscillator circuit 31b, antenna input circuit 23b and terminals 19b, 20b, 29, 30, 24b, 25b and 16b are generally the same as that of the channel just described in detail, differing only in constants and dimensions provided in order to generate local oscillations of a different frequency and to optimize the voltage amplification of received signals in a different channel.

Reference is now made to the novel channel selector unit illustrated in Figs. 1–8. The circuit elements symbolically shown in Fig. 9 bear the same reference numerals as the identical circuit elements illustrated in Figs. 1–8.

Figure 5:
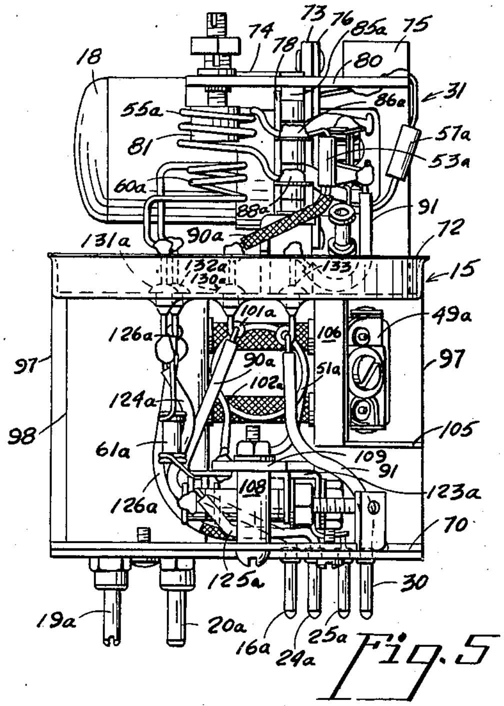
Figure 7:
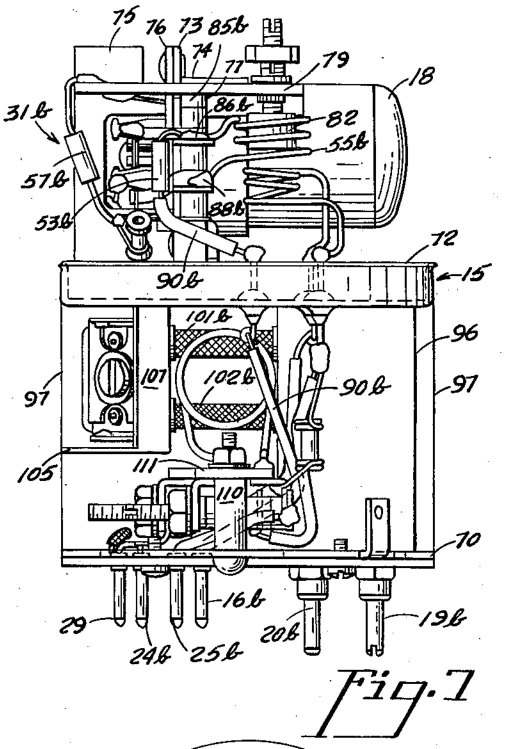
Figure 6:
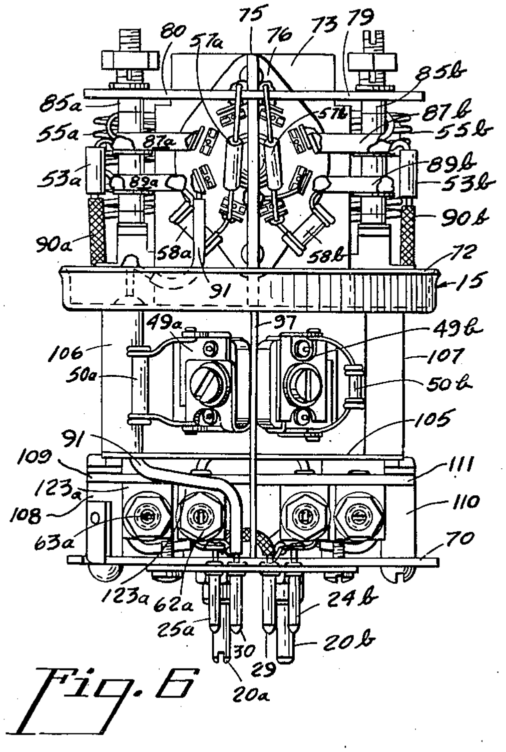
Figure 8:
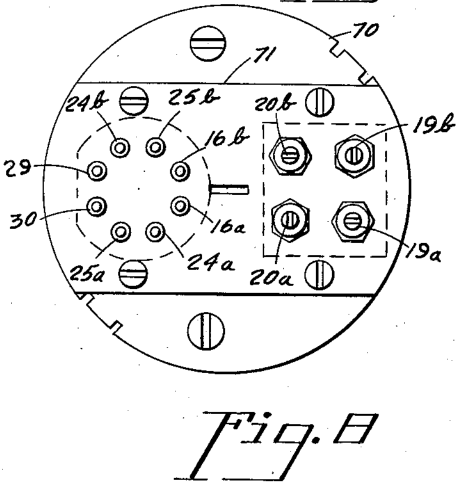

The unit is provided with a metallic mounting or frame 15 which has a circular base 70 apertured in two places to accommodate conductors connected to plug terminals of the groups 19a, 19b, 20a, 20b and 16a, 16b, 24a, 24b, 25a, 25b, 29, 30 (Fig. 8). The latter group are simple point plug elements (Figs. 5–7). The former group have removable jacket plug nuts screwed on to short screws, for antenna flexibility purposes explained, disclosed and claimed in the copending patent application of Harland A. Bass, entitlted "Antenna connector system," Serial No. 785,245, filed in the United States Patent Office November 12, 1947, and assigned to the same assignee as the present invention and application. This arrangement of plug jackets is claimed in that application and is not specifically a part of the present invention. Secured to the base as by screws (Fig. 8) is an insulating strip 71 on which these two groups of plugs are mounted.

Figure 3:
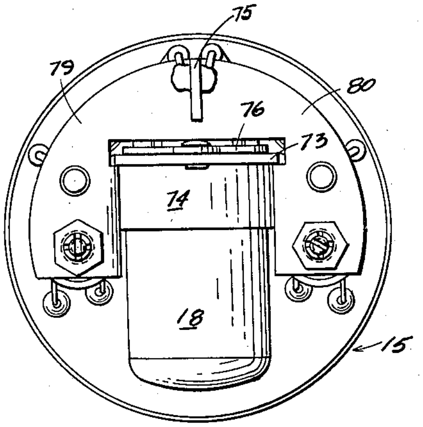

The mounting 15 also includes a ceiling member or horizontal divider 72 having an upturned annular flange. Secured on top of the ceiling, for example, by soldering, is a metallic support 73 for the socket 76 of tube 18. The support 73 has a metallic rearwardly extending central fin 75, suitably cut out to provide space for a tube socket insulation terminal strip and terminals. Secured to the metallic support 73 and its fin 75 is a generally semi-circular member having wings 79 and 80 (Fig. 3). These wings support adjustably mounted magnetic slugs 81, 82 which project into oscillator tank circuit coils 55a and 55b respectively, for tuning the local oscillator circuits 31a and 31b respectively. Shunted across coil 55a is a pair of series-arranged tank capacitances comprising a grounded plate 85a, a plate 86a connected by a strap 82a to an anode terminal (No. 3) of tube 18 and a plate 88a connected through a strap 89a and a blocking capacitor 58a to a grid terminal (No. 1) of tube 18. Grid resistor 57a is mounted between the last-mentioned grid terminal and grounded fin 75. The plate socket terminal is connected to the +B 16a by plate load resistor 53a and suitably insulated conductor 90a. One side of the filaments (terminal No. 2) is connected to the high side of the filament supply A or terminal 30 by a suitably insulated conductor 91. The cathode (No. 4) and the other side of the filament (terminal No. 7) are grounded to wing 80 and fin 75, respectively. The socket base and shield 74 are also grounded to fin 75. The foregoing description of the mechanical details of the oscillator section 31*a* makes apparent the construction of the oscillator section 31*b*, comprising slug 82, tank coil 55*a*, tank circuit capacitor 56*b*, blocking capacitor 58*b*, grid resistor 57*b*, and the grid (No. 8), ground side of filament (No. 7), anode (No. 6), cathode (No. 4), (No. 5 grounded to wing 79), and high side of filament (No. 2) terminals of tube 18.

A type 7F8 twin triode tube (8 BW base) is suitable for use as the oscillator tube.

Figure 4:
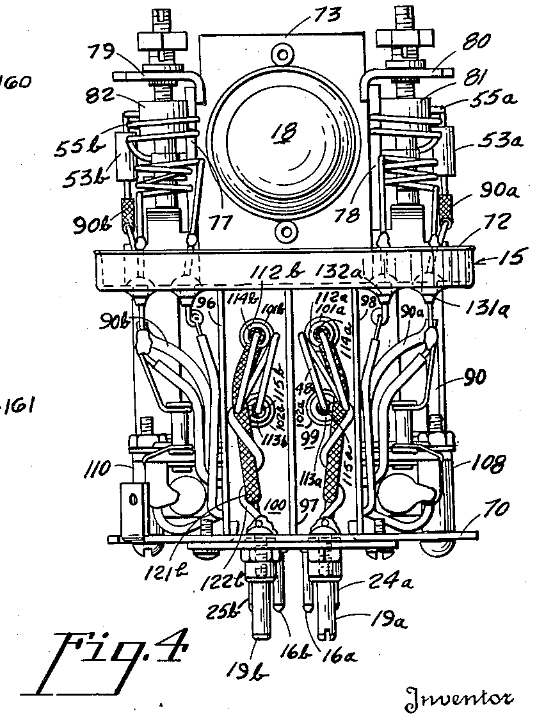

The description now proceeds to the antenna input transformer sections of the channel selector unit. As best shown in Figs. 4, 5 and 7, two shielding compartments are provided between ceiling 72 and base 70 by partitions 96, 97 and 98 disposed in perpendicularity therebetween. These compartments preferably extend rearwardly slightly beyond the plug members 20*a*, 20*b*. The rear walls 99, 100 of the components disposed transversely of partitions 96, 97 and 98 are apertured to receive the ends of insulating sleeves 101*a*, 102*a*, and 101*b*, 102*b* respectively. Partition 97 extends substantially across the diameters of members 72 and 70, as shown in Figs. 5 and 7. Two other shielding compartments are provided at the rear by a generally arcuate partition member 105, extending transversely of wall 97, and two wall members 106 and 107. The construction of these partitions and compartments is such as not only to provide a mounting for the various compartments but also to shield them. It will be noted that member 72 shields the two oscillator sections from the antenna input transformer sections. Secured to the base member 70 as by the screw and nut arrangement shown, is an insulating spacer 108 (Fig. 5) at the top of which there is mounted a strip of rigid insulation 109, extending transversely of spacer 108 to wall 97. On the other side of wall 97, there are similarly provided insulating spacer 110 and insulating strip 111 (Fig. 7).

The antenna input systems are generally similar, differing only in circuit dimensions, so that the following description is confined to that one of those sections which is generally designated in Fig. 9 as 23*a*.

Concentrically disposed within and throughout the length of sleeve 101*a* (Figs. 4 and 7) is provided a tubular shield member 112*a*. Similarly disposed within sleeve 102*a* is a tubular shield 113*a*. The shield 52*a* (Fig. 9) includes members 112*a*, 113*a*. Concentrically disposed within the shields 112*a*, 113*a*, are insulating sleeves 114*a*, 115*a*. The primary 46*a*, 47*a* of the antenna transformer is a hair pin having its two sections disposed within sleeves 114*a*, 115*a*, and shielded by elements 112*a*, 113*a*, respectively. Elements 101*a*, 102*a*, 112*a*, 113*a*, 114*a*, 115*a*, extend from and project through rear wall 99 to the front wall defined by partition member 106, which is apertured to receive 112*a*, 113*a*, 114*a*, 115*a*. Shield 52*a* is grounded by conductively securing members 112*a*, 113*a* to wall 106. The primary is tuned by a fixed capacitor 50*a* and a variable capacitor 49*a*, shunted across its open end and mounted in the compartment defined by numbers 105, 106. This primary is shunted by a fixed capacitor 50*a*, and aligned at its open end with a trimmer 49*a*, mounted in the compartment defined by members 105, 106. The coil 48*a* between the hair pins 46*a*, 47*a* is mounted within the partition defined by wall members 97 and 98 (Fig. 4).

The primary coil 46*a*, 47*a*, 48*a* may be made of continuous lengths of wire onto which conductors 121*a* and 122*a* are tapped, thereby dividing the hair pin 46*a*, 47*a* from the coil 48*a*. Conductors 121*a* and 122*a* are terminated in terminals 19*a*, 20*a*, respectively.

Secondary coil 51*a* is supported on strip 109 by its leads and disposed with its central axis perpendicular to the primary 46*a*, 47*a*, as best shown in Fig. 5. Capacitor 63*a* is mounted on and has one terminal connected to a downturned lug on bracket 123*a* (Figs. 5, 6) riveted to strip 109 and connected to terminal 25*a*. The other terminal of capacitor 63*a* is connected to fixed capacitor 61*a*, also to terminal 24*a* by conductor 125*a*. The remaining terminal of capacitor 61*a* is connected by conductor 124*a* to capacitor 62*a*. Capacitor 62*a* is also mounted on and has one terminal connected to a lug or bracket 123*a*, connected to terminal 25*a*.

To complete the circuit for applying local oscillations to the terminals 24*a*, 25*a*, 30, coil 60*a* is mounted atop ceiling 72 in alignment with oscillator tank coil 55*a*. Conductor 126*a* connects one lead of this coil to terminal 29. Conductor 124*a* connects the junction of the other coil 60*a* lead and capacitor 61*a* to capacitor 62*a*. Elements 24*a*, 25*a*, 60*a*, 61*a*, 62*a*, 124*a*, 125, 126*a*, 29 collectively function to apply local oscillations to the frequency converter input.

Ceramic insulating sleeves 130*a*, 131*a*, 132*a* and 133 are employed for leading conductor 90*a*, the line from coil 60*a* to capacitors 61*a*, 62*a*, and conductors 126*a* and 91 through ceiling member 72. The upper compartment is hermetically sealed.

In Fig. 11 there is shown an alternative form of circuit suitable for incorporation in the dual channel selector unit. One channel is illustrated, and it will be understood that the other channel may be generally similar, differing in circuit dimensions. Circuit elements of Fig. 11 identical with Fig. 9 circuit elements have identical reference numerals and similar elements have major letter suffixes. In the Fig. 11 circuit the oscillator and antenna input sections are so similar to those illustrated in Fig. 9 that further description is deemed unnecessary. Substituted for the three capacitors 61*b*, 62*b*, 63*b* is a single double ended fixed capacitor 63B. Oscillator voltage is taken from a tap 135B on coil 55B and introduced at the center terminal of capacitor 63B, shunted across coil 51B. This tap is also connected to plate resistor 53B for anode supply. The mounting 15 and tube shield 73 are grounded at 136. This alternative circuit has the advantage that coil 60*b*, sleeve 132*b*, conductor 126*b*, terminal 29, conductor 124*b*, and sleeve 131*b* are dispensed with. The main difference between the Figs. 11 and 10 circuits resides in the fact that in the Fig. 11 commercially preferable circuit, oscillator voltage is taken from tap 135 rather than from a coupling coil. Coil 51*b* is tuned by a magnetic slug 137.

In Fig. 11 one position of each of switch sections 17*a*, 17*b*, 17*d*, 17*e*, 17*f* is schematically shown. Switch section 17*c* is also dispensed with. Terminals 29, 29′ are not used.

Referring now specifically to Fig. 10 the coupling of the channel selector to the converter stage is shown. The cathodes of the converter tube 28 are grounded through switch section 17c. The antenna input transformer secondary terminals are individually coupled to the control electrodes 26 and 27 through switch sections 17d and 17e. Both terminals of secondary 51b are at the same D. C. potential so that only one grid resistor 140 need be provided (coupled to grid 26 in Fig. 10 or grid 27 in Fig. 11). The anodes of tube 28 are coupled as by terminals 141, 142 to the intermediate-frequency amplifier input transformer (not shown). One filament lead is grounded and the other (as well as terminal 39) are connected to the high side of the filament supply (A).

Shunted across the individual input circuits of tube 28 are glass trimmer capacitors 143 and 144. These capacitors insure fixed input capacitances to the converter circuits and provide for consistent performance of the converter stage with all channel selector units. These capacitors are employed to equalize the converter input capacitances. Capacitors 145 and 146 are provided for neutralizing grid-plate capacitances, capacitor 145 being connected between terminal 141 and grid 27 and capacitor 146 between terminal 142 and grid 26.

Referring now specifically to Fig. 12 it will be seen that the converter tube 28, the sockets 35, 36, 37 and 38 and the channel selector switch 17 are mounted as a subassembly on a base 150, secured to chassis 151. The sockets and the tube are arranged substantially in a rectangle with the channel selector switch 17 in the center, in order to make the wiring to all channel selector units as uniform as possible.

Although the invention is not limited to any specific circuit parameters, the following parameters have been found satisfactory in one successful embodiment of the invention:

| Components | Parameters |
|---|---|
| Channel Selector Unit for Channel 2 (54–60 megacycles per Fig. 11): | |
| Tube 18 | Type 7F8. |
| Capacitor 58B | 15 m. m. f., ceramic. |
| Capacitor (88B side) | 100 m. m. f. } dual ceramic. |
| Capacitor (86B side) | 40 m. m. f. } dual ceramic. |
| Capacitor 63B | 5 m. m. f. on each side, dual ceramic. |
| Capacitor 49B | 25–270 m. m. f., trimmer, mica. |
| Resistor 57B | 390,000 ohms, ½ watt. |
| Resistor 53B | 8,200 ohms, ½ watt. |
| Anode Voltage | 200 volts. |
| Tank Coil 55B | 2½ turns, dia. of coil 13/32", wire gauge #14. |
| Primary 46B, 47B, 48B | 1¾ turns, dia. of coil 9/16", wire gauge #14. |
| Secondary 51B | 5½ turns, dia. of coil 11/16", wire gauge #16. |
| Converter Stage: | |
| Tube 18 | T7F8. |
| Capacitors 143 and 144 | Each 0.3–3 m. m. f. glass trimmer. |
| Capacitors 145 and 146 | Each 1.3 m. m. f. fixed. |
| Plate Voltage | 100 volts. |
| Resistor 140 | 1 megohm, ¼ watt. |
| Intermediate Frequency | 37.3 m. c. picture, 32.8 m. c. sound. |
| Picture Carrier Channel 2 | 55.25 m. c. picture, 59.75 m. c. sound. |
| Local Oscillator Frequency | 92.5 m. c. |

In accordance with a feature of the present invention, a high degree of frequency stability of the channel selector units is provided. The effects of humidity on the oscillator have been completely eliminated by placing the entire oscillator in a hermetically sealed metal container (Figs. 1, 2), comprising an inverted metal cup 160 soldered to the upstanding annular flange on the horizontal divider or ceiling member 72 (Fig. 3). The lower or antenna input circuit section is shielded but not sealed by a cylindrical metallic shield 161, having one end fitted over the flange of the ceiling member 72 and the other end screwed to upstanding integral lugs on base 70. As shown in Figs. 5 and 7, the oscillator tank circuit capacitors 56a, 56b are supported at both ends and the slugs 81 and 82 are securely positioned by split bushing locks, in order to prevent drift due to mechanical abuse. Cup 160 has two integral upstanding hollow exteriorly threaded bosses adapted to be tightly closed by removable interiorly threaded caps 152, 153, to provide ready access to the adjustments for the magnetic slugs. The large tank capacitors 56a and 56b minimize warm-up drift and the frequency drift effects of line voltage variations. To minimize drift with temperature, the temperature co-efficient of the tank capacitors is chosen in such a manner as to make the temperature co-efficient of the entire tank circuit substantially zero and the oscillator is adjusted at the average temperature of the oscillator section within the range of temperatures experienced in operation. Strains are equalized by subjecting the channel selector units to a temperature on the order of 120 degrees centigrade for a period of one to two hours prior to final alignment.

Coming now to a description of the operation of the above-described circuits and structures, it will be assumed that switch 17 is turned to the position shown in Fig. 10. Wave signals are intercepted by the antenna system and applied to terminals 19a, 20a and the antenna input transformer primary 46a, 47a, 48a. The primary tuning is adjusted by capacitor 49a and the secondary tuning is adjusted by capacitor 63a, so that the antenna input circuit is a selective band-pass circuit which voltage-amplifies the received signals and applies them to terminals 24a, 25a and the grids 26, 27 of the converter stage. This band-pass circuit is optimized for the particular channel. The use of a neutralized triode converter results in a favorable input impedance to the converter stage, so that a reasonable gain is realized in the antenna transformer. Local oscillations of fixed frequency appear in the tank circuit 55a, 56a of the oscillator 31a and are picked up by coil 60a, electromagnetically coupled to tank circuit inductor 55a. The local oscillations are applied to terminals 24a, 25a and the grids 26, 27 of the converter by capacitors 61a, 62a, in balanced relation to terminal 29 (or converter cathode).

Balanced oscillator radiation into the antenna circuit is minimized by balanced coupling between secondary coil 51a and primary coils 46a, 47a, and by the balanced converter input circuit. The net oscillator voltage across secondary 51a, as seen by primary 46a, 47a is substantially zero, since the two sections of twin triode 28 are alike in phase angle and capacity load, so that radiation voltages applied to primary coil 46a are cancelled by those applied to primary coil 47a.

Since electrostatic coupling between the primary 46a, 47a and 48a to the secondary coil 51a is almost eliminated by means of the electrostatic shield 52a, only the electromagnetic coupling is left. Consequently, a push-push signal will induce no voltage in the secondary since it will not result in a magnetic field.

To prevent unbalanced radiation electrostatic and electromagnetic coupling between all circuits carrying oscillator voltage and the antenna is minimized. Electrostatic coupling between the oscillator and antenna wiring is prevented by locating the channel selector circuit wiring and elements, such as the antenna input transformer circuit and the oscillator circuit, within separately shielded enclosures. Fin 75 shields from each other the two oscillator circuits external to tube 18. The center partition 97 shields antenna transformer circuit 23a from the similar circuit 23b.

The hair pin primary such as 46a, 47a is shielded from the secondary, such as 51a, by shield 52a, consisting of tubular members 112a, 113a, grounded to partition 106. Additional shielding between primary and secondary circuits is provided by placing each primary tuning trimmer such as 49a in a separate compartment, for example, the compartment defined by members 105, 106. Further, each primary tapping coil, such as 48a, together with the antenna leads, such as 121a, 122a, is mounted in a separate compartment, as defined by walls 97, 98, 99 for example. The four-prong plug underlying the walls 96 and 98 carries only the antenna terminals 19a, 19b, 20a, 20b, thereby minimizing the amount of oscillator power coupled into the antenna through electrostatic coupling. The channel selector unit is so well shielded and balanced that a preceding R. F. stage may be dispensed with, without exceeding a reasonable amount of oscillator radiation.

The oscillator circuits are optimized and so stable and fixed-tuned that no vernier tuning is required. They apply oscillations of a predetermined frequency to the input circuits of converter tube 28. In the converter stage the local oscillations and amplified received signals are heterodyned or beat together to produce resultant different-frequency intermediate-frequency signals which are then selectively amplified in the intermediate-frequency amplifiers in a manner well known to those skilled in the art.

From the foregoing description, it will be seen that the invention radically enhances convenience, service, economy and performance in television reception and the like. Convenience, because vernier tuning is dispensed with, the operator simply turning a channel selector switch to a predetermined position or otherwise bringing into operation a specific channel selector unit, whereupon that unit strongly discriminates against and attenuates signals in other channels but amplifies received signals in the desired channel and applies such desired received signals and stable oscillations of proper frequency to the first converter stage. Strong, relatively interference-free, intermediate-frequency signals having a stable carrier frequency are accordingly produced. Service, because the channel selector units are easily repaired or replaced without putting out of operation other selector units and the receiver as a whole. Economy, because the consumer does not have to purchase channel selector units for all of the assigned television channels. If only one channel is available in his district, for example, he requires only one channel selector unit and need not purchase any additional units. Performance, because each channel selector unit is concerned with only one television channel and may be designated to handle that channel with maximum gain, selectivity, sensitivity, efficiency, fidelity and stability. The invention departs radically from conventional television practice and provides for truly tailored television reception.

While there has been shown and described what is at present considered to be the preferred embodiment of the present invention, it will be obvious to those skilled in the art that various changes, modifications and substitutions of equivalents may be made therein without departing from the true scope of the invention, and it is, accordingly, intended in the appended claim fairly and properly to cover all such changes, modifications and substitutions as fall within the true scope of the invention.

Having fully described my invention, I claim:

A channel selector unit for insertion between the antenna circuit and the first frequency converter stage of a superheterodyne television receiver, of the type including wave intercepting means having output contacts and a frequency converter having input contacts and a potential supply having an output contact, comprising a mounting member having contacts complementary to the aforementioned contacts, a fixed-tuned antenna input circuit carried by said member having an input adapted to be coupled through the first-mentioned contacts and their complementary contacts to said wave intercepting means, said antenna input circuit having an output adapted to be coupled through the second-mentioned contacts and their complementary contacts to said frequency converter, a fixed-tuned local oscillator having an output adapted to be coupled through the last-mentioned contacts to said frequency converter and an electrode adapted to be coupled through the third-mentioned contact and its complementary contact to said supply, said antenna input circuit being optimized to pass intercepted carrier signals within a distinct desired channel and said oscillator being optimized to apply to said converter oscillations of a frequency appropriate to heterodyne said received signals to a predetermined intermediate frequency, whereby insertion and switching of said unit into said receiver conditions said receiver to select carrier wave signals within a single desired channel.

JOHN DRYSDALE REID.

REFERENCES CITED

The following references are of record in the file of this patent:

UNITED STATES PATENTS

| Number | Name | Date |
|---|---|---|
| 1,612,952 | Stevenson | Jan. 4, 1927 |
| 1,666,505 | Peterson | Apr. 17, 1928 |
| 1,816,461 | Baird | July 28, 1931 |
| 1,851,354 | Flewelling | Mar. 29, 1932 |
| 2,029,461 | Brush | Feb. 4, 1936 |
| 2,062,379 | Silver | Dec. 1, 1936 |
| 2,173,898 | Conron | Sept. 26, 1939 |
| 2,285,372 | Strutt | June 2, 1942 |
| 2,383,322 | Koch | Aug. 21, 1945 |
| 2,421,676 | Beard | June 3, 1947 |
| 2,440,308 | Storck | Apr. 27, 1948 |

OTHER REFERENCES

Article in Radiocraft, January 1939, pages 400–401, and 431.